(12) United States Patent
Asao

(10) Patent No.: US 6,396,184 B1
(45) Date of Patent: May 28, 2002

(54) ALTERNATOR

(75) Inventor: Yoshihito Asao, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/636,631

(22) Filed: Aug. 11, 2000

(30) Foreign Application Priority Data

Jan. 31, 2000 (JP) ........................................ 2000-022687

(51) Int. Cl.$^7$ ................................................ H02K 3/00
(52) U.S. Cl. ........................ 310/180; 310/42; 310/184; 310/201
(58) Field of Search ................................ 310/179, 180, 310/184, 193, 194, 201, 42

(56) References Cited

U.S. PATENT DOCUMENTS 3,792,299 A * 2/1974 Hallerbaeck ................. 310/258
5,994,813 A * 11/1999 Umeda et al. ............... 310/180
6,147,432 A * 11/2000 Kusase et al. ............... 310/260
6,191,508 B1 * 2/2001 Aoki et al. ................... 310/45

FOREIGN PATENT DOCUMENTS

| DE | 199 22 794 A1 | 11/1999 | |
|---|---|---|---|
| JP | 11-155270 A | 6/1999 | |
| JP | 11-234933 | 8/1999 | ............ H02K/3/20 |

* cited by examiner

Primary Examiner—Burton S. Mullins
(74) Attorney, Agent, or Firm—Sughrue Mion, PLLC

(57) ABSTRACT

A front-end coil end and a rear-end coil end include a number of extended portions constituted by conductors which are lined up circumferentially, and the front-end coil end and the rear-end coil end have a hardness distribution in which hardness varies in an axial direction, the hardness distribution being the same in both coil ends.

10 Claims, 18 Drawing Sheets

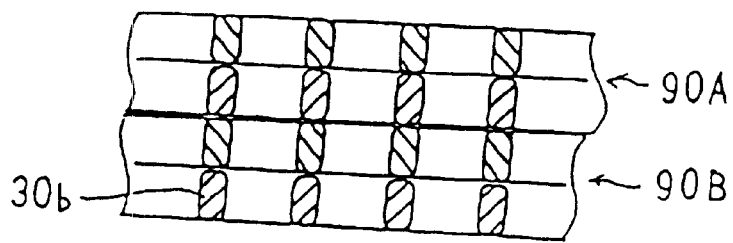
FIG. 12(a)
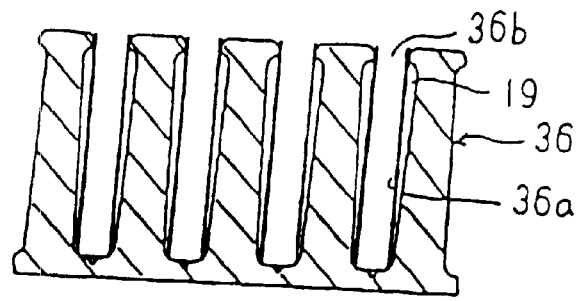
FIG. 12(b)
FIG. 12(c)
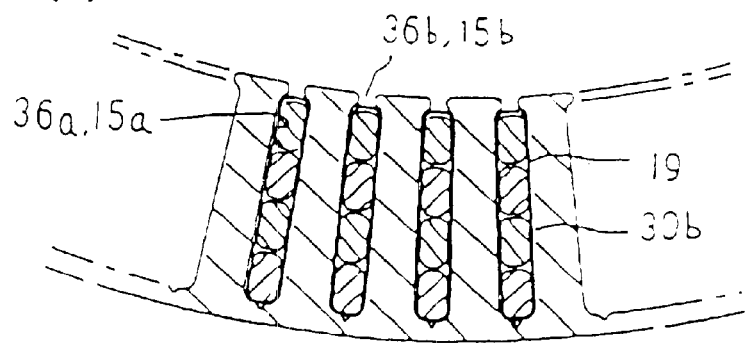

ALTERNATOR

BACKGROUND OF THE INVENTION

1. Field of the Invention

The present invention relates to an alternator driven by an internal combustion engine, for example, and relates to the construction of a stator for an automotive alternator mounted to an automotive vehicle such as a passenger car or a truck, for example.

2. Description of the Related Art

As automotive engines have become quieter, noise reduction has become desirable in auxiliary engine machinery, and the need for magnetic noise reduction particularly in automotive alternators mounted to engines, for example, has been strong, but there has been a tendency for magnetic noise to increase more and more with increased output.

Magnetic noise is caused by a stator core resonating due to magnetic excitation arising in an air gap portion between facing portions of a stator and a rotor, and it is necessary to suppress vibrations in the stator which is the source thereof because these vibrations radiate as magnetic noise. Because the stator core is constructed by laminating thin plates and is provided with long slender teeth, rigidity is low, and the shape is particularly prone to vibration, and there have been limits to improving the rigidity of the stator itself without increasing the size or weight thereof. Thus, consideration has been given to damping vibration in the stator core by means of a stator winding which is another structural component of the stator. Specifically, the aim has been to absorb vibrations in the stator core by means of the spring and damping factors of the stator winding, but there have been manufacturing problems such as those described below, and it has been difficult to control the hardness of the stator winding, which dictates the spring factor.

Japanese Publication No. HEI 4-61584 discloses a method for manufacturing a stator by inserting a stator winding into a stator core formed with slots on an inner circumferential surface, insertion being made from an axial direction using a winding insertion device.

In this example, the stator winding, which is first constructed by forming conductors into a star shape, is forcefully inserted from an axial direction into the cylindrical stator core, and there is a risk at this stage that the conductors will interfere with each other, or interfere with the stator core, causing damage, besides which coil ends of the stator winding protruding from both axial end surfaces of the stator core are not uniform, preventing achievement of a desired hardness distribution in the coil ends, and since the mechanical load applied to the coil ends varies greatly in the insertion method in question, large discrepancies in the hardness distribution have arisen between the two coil ends.

Japanese Patent Laid-Open No. HEI 9-103052, which was filed by the present applicants, discloses a stator for an alternator in which the assembly operation in which the stator winding is inserted into the stator core is significantly improved compared to the above publication.

FIG. 18 is an overall perspective of the stator for the automotive alternator described in this patent laid-open. This stator 140 includes: a cylindrical stator core 150 composed of a laminated core formed with a number of slots 150a extending axially at an even pitch in a circumferential direction; and a stator winding 170 wound onto the stator core 150. The stator winding 170 is a three-phase alternating-current winding composed of an a-phase alternating-current winding portion 170a, a b-phase alternating-current winding portion 170b, and a c-phase alternating-current winding portion 170c, and is constructed by bundling round wires in which a copper surface is coated with insulation. Moreover, Oa, Ob, and Oc are a-phase, b-phase, and c-phase output wires and Na, Nb, and Nc are a-phase, b-phase, and c-phase neutral-point lead wires.

In the stator 140 of the above construction, the a-phase alternating-current winding portion 170a, the b-phase alternating-current winding portion 170b, and the c-phase alternating-current winding portion 170c, which are first formed in a flat shape, are installed in a parallelepiped laminated body 183 so as to be stacked one on top of another, as shown in FIG. 19, and then, the stator 140 is prepared by bending the laminated body 183 into a cylindrical shape by means of a forming device (not shown) and welding core abutting portions 184.

Although the stator 140 for an automotive alternator shown in FIG. 18 significantly improves the assembly operation in which the stator winding is inserted into the stator core 150, the stator winding 170 is constructed by winding flexible round wires, and the round wires in a first coil end 190a and a second coil end 190b protruding from both axial end surfaces of the stator core 150 and not aligned, are nonuniform, and interfere with each other, and like the stator described in Japanese Publication No. HEI 4-61584, achievement of the desired hardness distribution in the coil ends 190a and 190b has not been possible. Furthermore, since mechanical loads are randomly applied to the coil ends 190a and 190b during formation of the cylindrical shape after the stator winding 170 has been inserted into the laminated body 183 because the round wires in the first coil end 190a and the second coil end 190b are not aligned and interfere with each other, the desired hardness distribution could not be achieved in the coil ends 190a and 190b.

Thus, since it has been difficult to achieve the desired hardness, the rigidity of the coil ends 190a and 190b at both axial ends of the stator core 150 has been different, and not only has it not been possible to sufficiently suppress vibrations in the stator core 150, but the vibrations have even been exacerbated by the vibrational phases of the coil ends 190a and 190b.

SUMMARY OF THE INVENTION

The present invention aims to solve the above problems and an object of the present invention is to provide a low-noise alternator by enabling the achievement of the desired hardness distribution in the coil ends, and suppressing vibrations in the stator core using this hardness distribution.

To this end, according to the present invention, there is provided an alternator comprising:

a rotor for forming north-seeking (N) and south-seeking (S) poles alternately about a rotational circumference; and a stator comprising:

a stator core surrounding the rotor; and a polyphase stator winding installed in the stator core, the stator core being formed with a number of slots extending axially at a predetermined pitch in a circumferential direction, the polyphase stator winding being provided with stator winding sub-portions in each of which a conductor is wound so as to alternately occupy an inner layer and an outer layer in a slot depth direction within the slots at intervals of a predetermined number of slots, the conductor folding back outside the slots at axial end surfaces of the stator core to form a first coil end and a second coil end, the first coil end and the second coil end comprising a number of extended portions constituted by the conductors being lined up circumferentially, and the first coil end and the second coil end having a hardness distribution in which hardness varies in an axial direction, the hardness distribution being the same in the first coil end and the second coil end.

BRIEF DESCRIPTION OF THE DRAWINGS

FIGS. 12(a) to 12(b) are cross sections explaining the manufacturing process for the stator of the automotive alternator in FIG. 1;

DETAILED DESCRIPTION OF THE PREFERRED EMBODIMENTS

Embodiment 1

Figure 1:
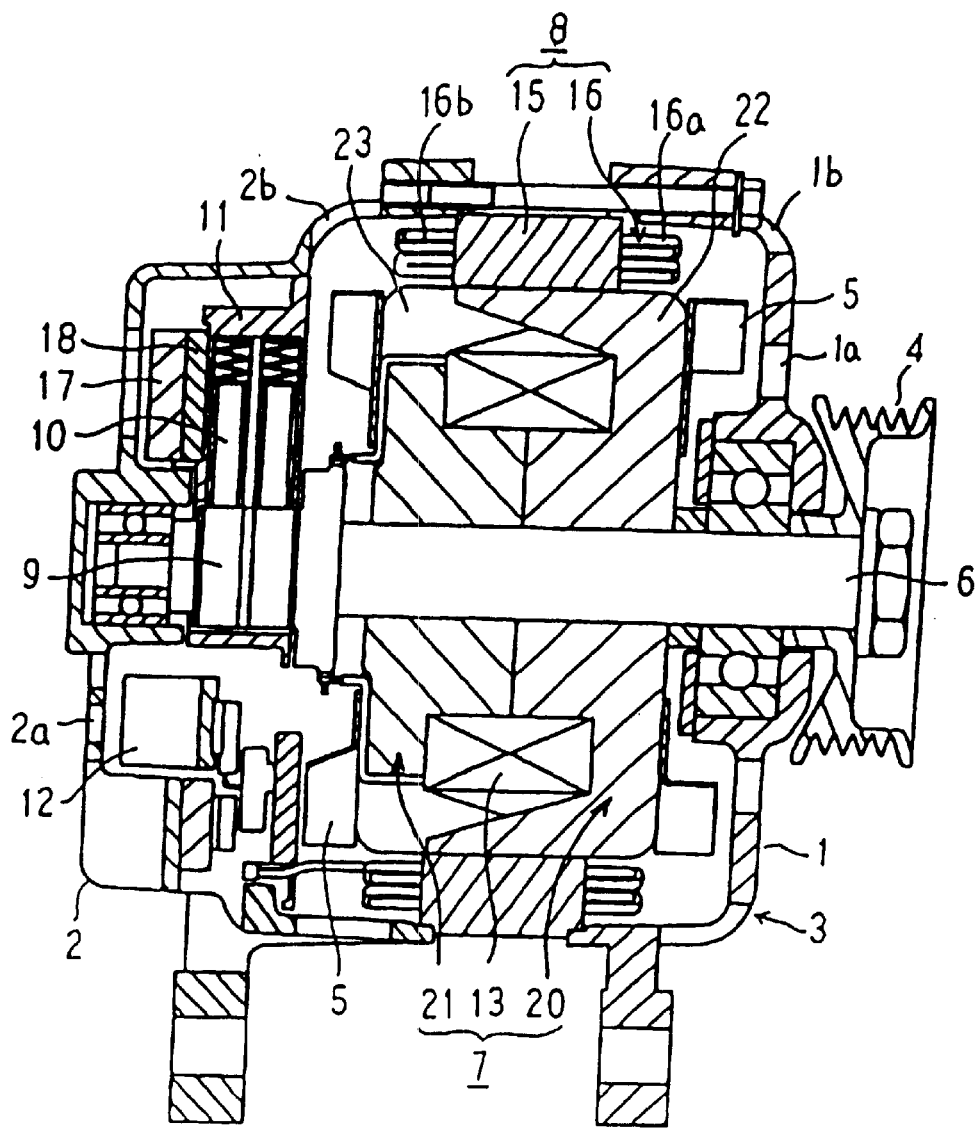
FIG. 1 is a cross section showing a construction of an automotive alternator according to Embodiment 1 of the present invention.
Figure 2:
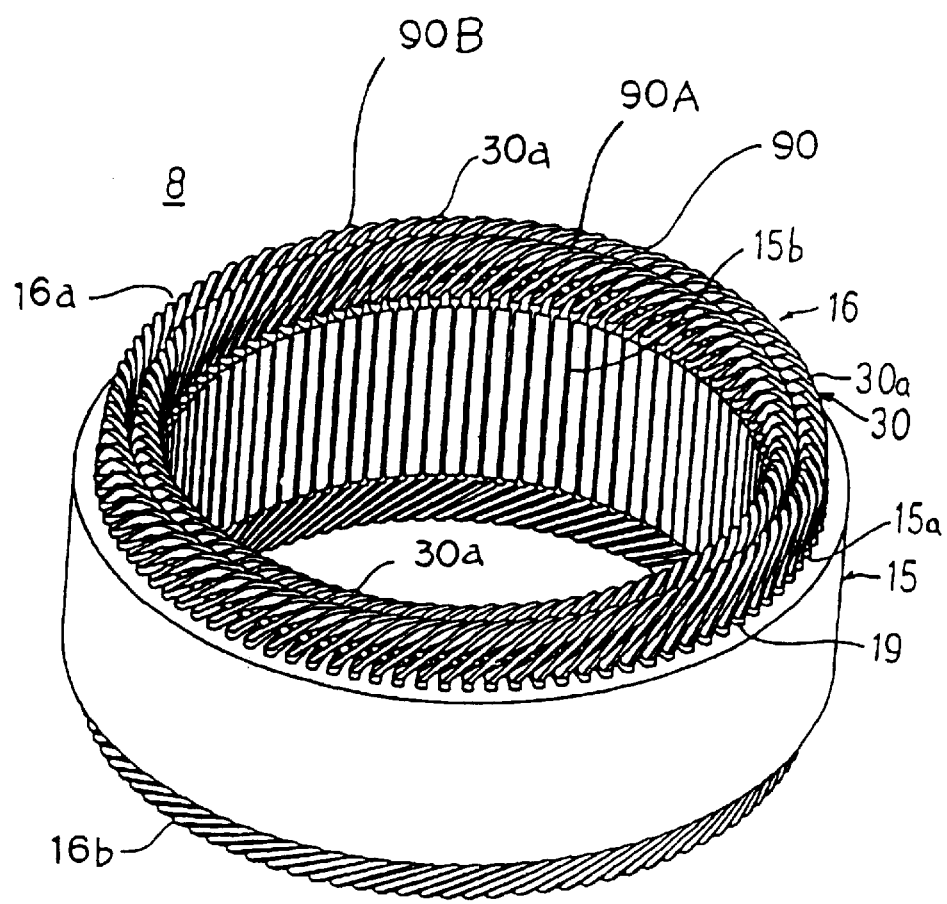
FIG. 2 is a perspective showing a stator of the automotive alternator in FIG. 1.
Figure 3:
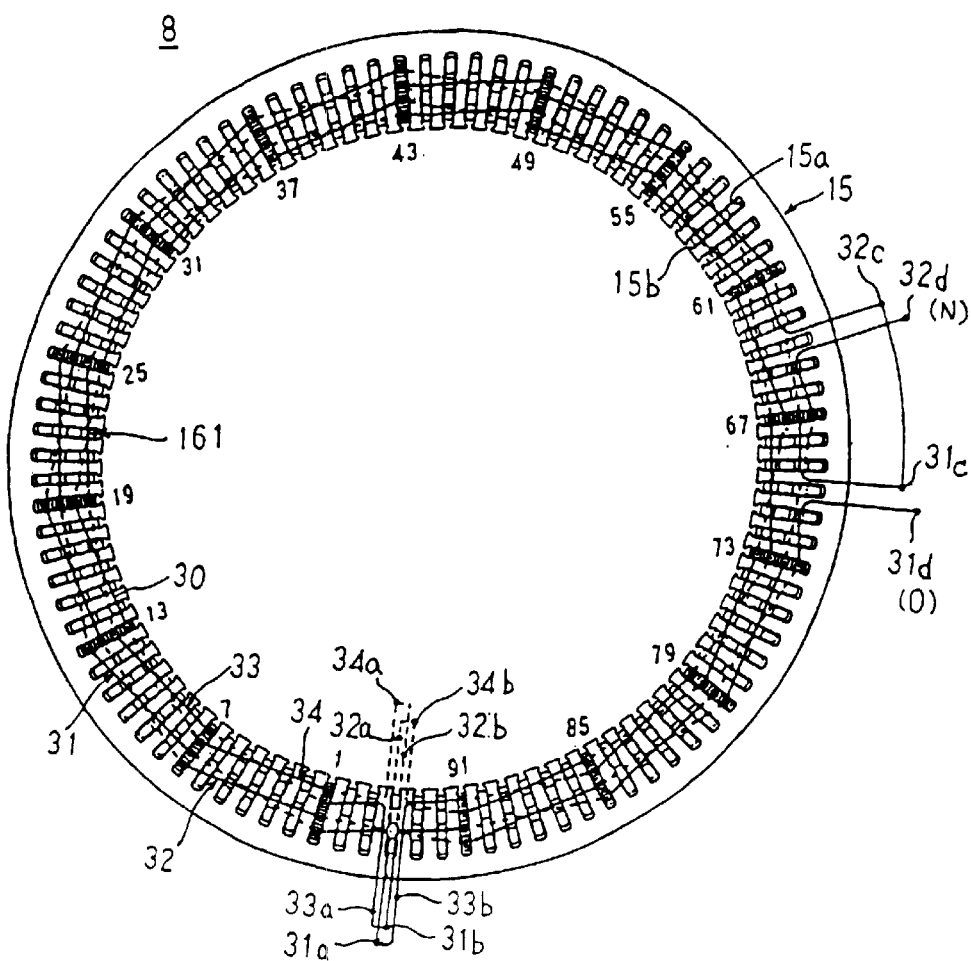
FIG. 3 is winding diagram for the stator in FIG. 1.
Figure 4:
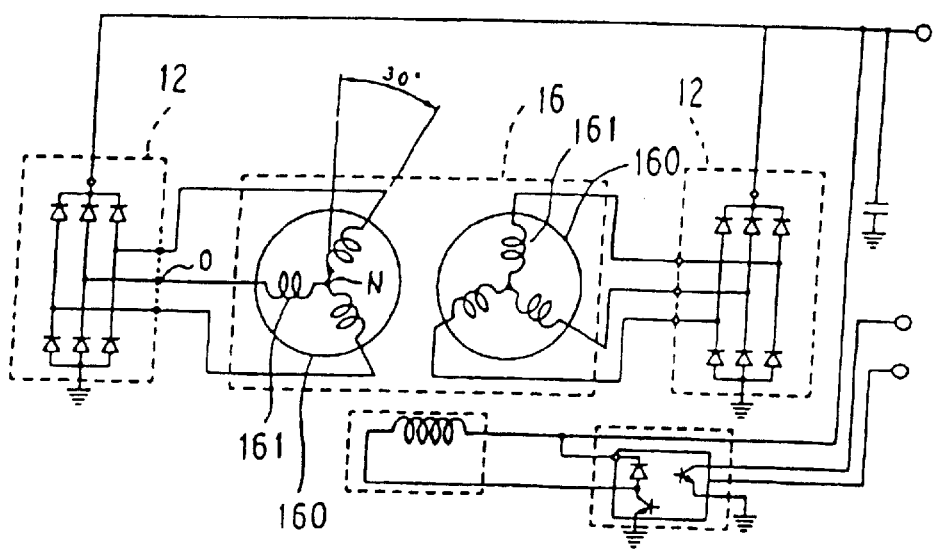
FIG. 4 is a circuit diagram for the automotive alternator in FIG. 1.

FIG. 1 is a cross section showing a construction of an automotive alternator according to Embodiment 1 of the present invention, FIG. 2 is a perspective showing a stator of this automotive alternator, FIG. 3 is winding diagram for the stator in FIG. 1, and FIG. 4 is an electrical circuit diagram for the alternator in FIG. 1. Moreover, the output wires and neutral-point lead wires of each phase have been omitted from FIG. 2.

This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5 secured to both axial end surfaces of the rotor 7; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; rectifiers 12 electrically connected to the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8.

The rotor 7 includes a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around outer circumferential edges, facing each other so as to intermesh.

The stator 8 includes: a cylindrical stator core 15 composed of a laminated core formed with a number of slots 15a extending axially at a predetermined pitch in a circumferential direction; a stator winding 16 wound onto the stator core 15; and insulators 19 installed in each of the slots 15a for electrically insulating the stator winding 16 from the stator core 15. The stator winding 16, which includes two sets of winding assemblies 90A and 90B, includes a number of winding sub-portions in each of which one conductor 30 is bent back outside the slots 15a at end surfaces of the stator core 15 and wound into a wave winding so as to alternately occupy an inner layer and an outer layer in a slot depth direction within slots 15a a predetermined number of slots apart.

The stator winding 16 has a front-end coil end 16a, which is a first coil end, and a rear-end coil end 16b, which is a second coil end, which protrude from their respective axial end surfaces of the stator core 15. The coil ends 16a and 16b are composed of a number of extended portions 30a. The extended portions 30a, which all have an identical shape, are separated circumferentially and radially, and arranged neatly in two rows.

Figure 16:
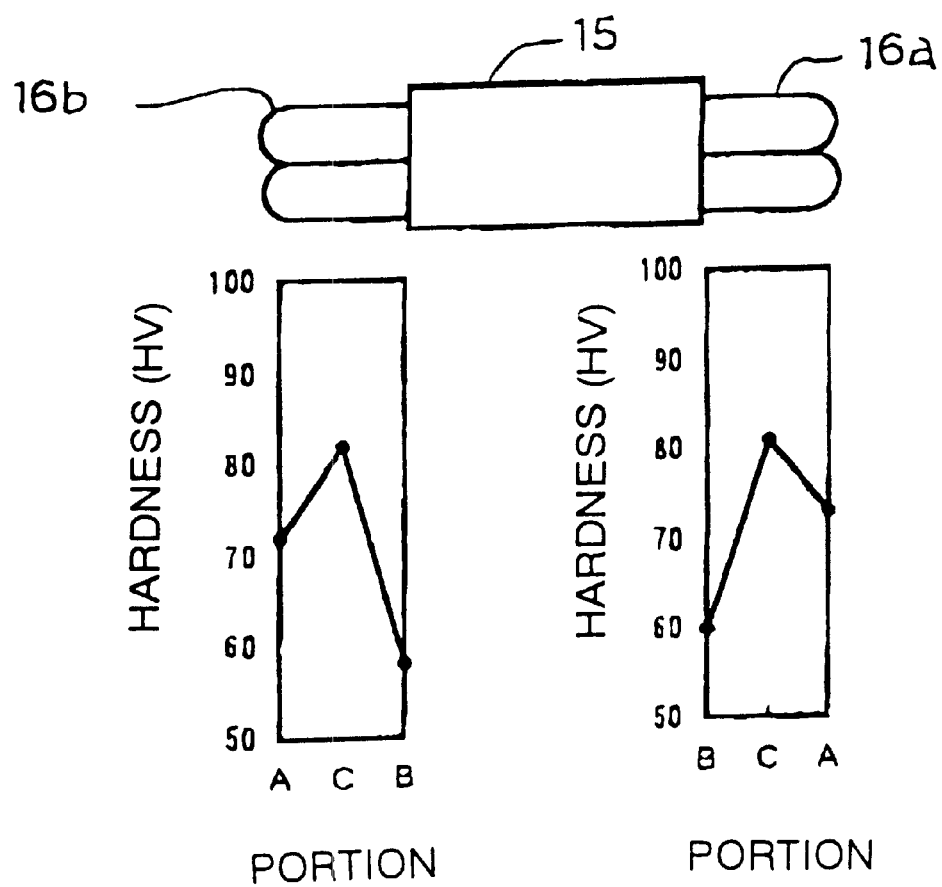
FIG. 16 is a hardness distribution diagram for coil ends.

As shown in FIG. 16, the axial hardness distribution of the front-end coil end 16a and the rear-end coil end 16b is the same, and the hardness distribution of the extended portions 30a is such that the hardness of a central portion thereof is greater than an end portion and a base portion.

Moreover, in this case, the stator core 15 is formed with ninety-six slots 15a at even pitch so as to house the two sets of stator windings 16 such that the number of slots housing each phase of the alternating-current windings corresponds to the number of magnetic poles (sixteen) in the rotor 7. Furthermore, long, insulated copper wire material having a rectangular cross section, for example, is used for the conductors 30.

Next, the winding construction of one phase of stator winding group 161 will be explained in detail with reference to FIG. 3.

One phase of stator winding group 161 is composed of first to fourth winding sub-portions 31 to 34 each formed from one conductor 30. The first winding sub-portion 31 is formed by wave winding one conductor 30 into every sixth slot from slot numbers 1 to 91 so as to alternately occupy a first position from an outer circumferential side and a second position from the outer circumferential side inside the slots 15a. The second winding sub-portion 32 is formed by wave winding a conductor 30 into every sixth slot from slot numbers 1 to 91 so as to alternately occupy the second position from the outer circumferential side and the first position from the outer circumferential side inside the slots 15a. The third winding sub-portion 33 is formed by wave winding a conductor 30 into every sixth slot from slot numbers 1 to 91 so as to alternately occupy a third position from the outer circumferential side and a fourth position from the outer circumferential side inside the slots 15a. The fourth winding sub-portion 34 is formed by wave winding a conductor 30 into every sixth slot from slot numbers 1 to 91 so as to alternately occupy the fourth position from the outer circumferential side and the third position from the outer circumferential side inside the slots 15a. The conductors 30 are arranged to line up in a row of four conductors within each slot 15a with the longitudinal direction of their rectangular cross sections aligned in a radial direction.

Then, at a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form a winding portion having two turns.

At a second end of the stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form a winding portion having two turns.

In addition, a portion of the conductor 30 of the second winding sub-portion 32 extending outwards at the first end of the stator core 15 from slot numbers 61 and 67 is cut, and a portion of the conductor 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, and a second cut end 31d of the first winding sub-portion 31 and a second cut end 32d of the second winding sub-portion 32 become an output wire (O) and a neutral-point lead wire (N), respectively.

A total of six phases of stator winding groups 161 are similarly formed by offsetting the slots 15a into which the conductors 30 are wound one slot at a time. Then, as shown in FIG. 4, three phases each of the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

Next, the assembly of the stator 8 will be explained with reference to FIGS. 5 to 14.

Figure 5:
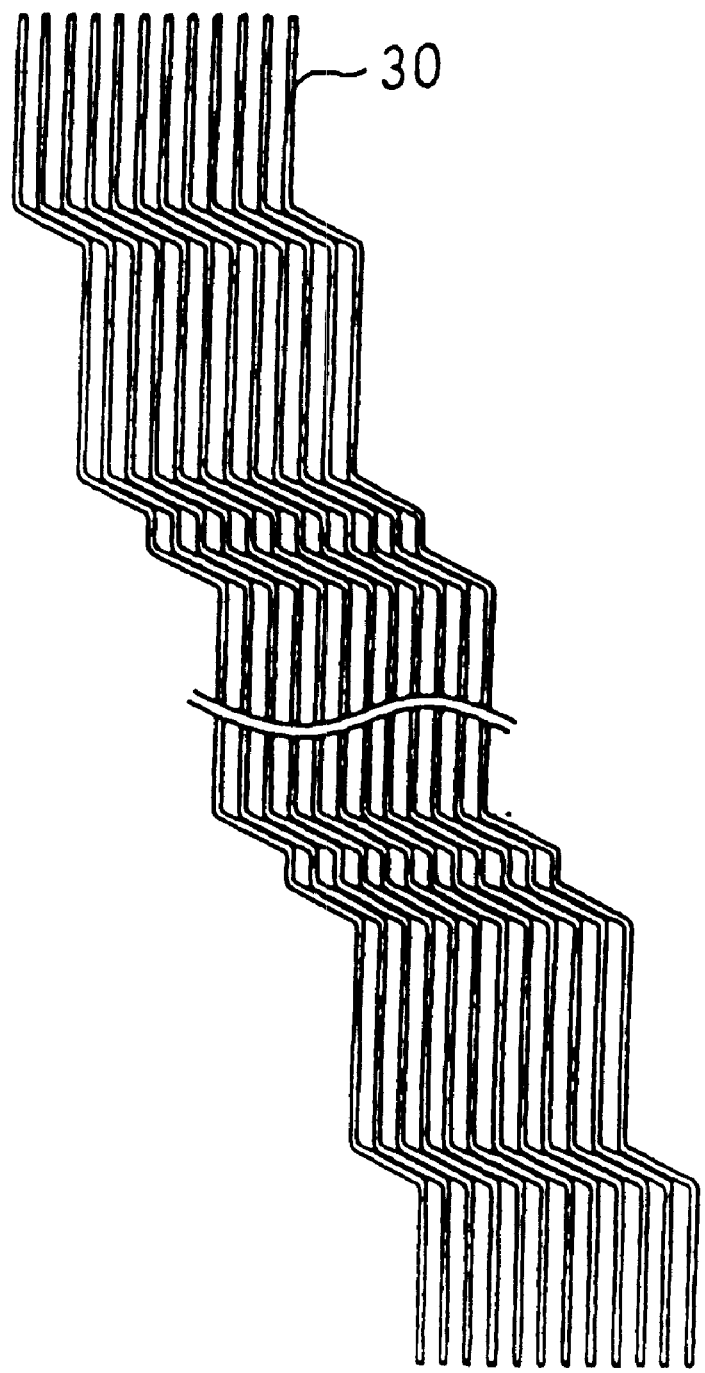
FIG. 5 is a diagram showing a three-phase stator winding of the automotive alternator in FIG. 1 during manufacture.
Figure 6:
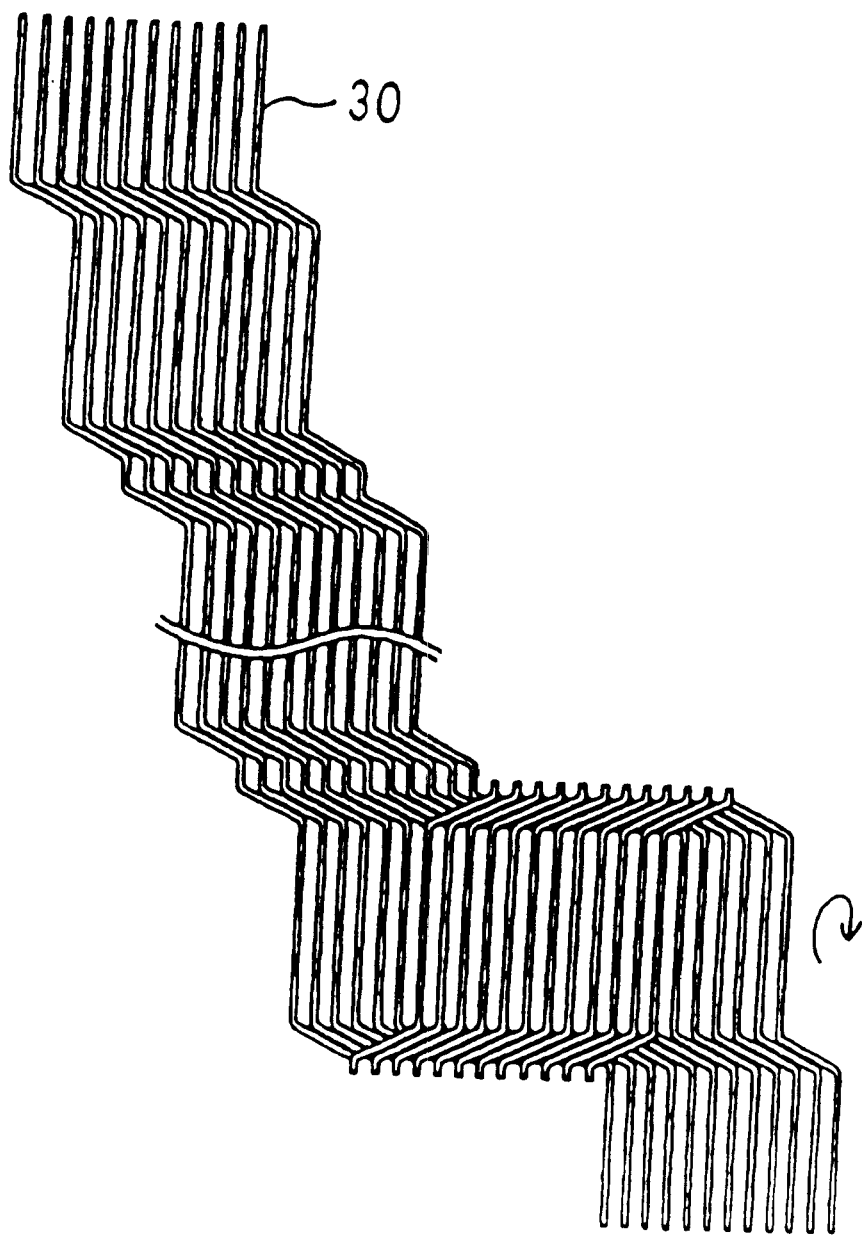
FIG. 6 is a diagram showing a three-phase stator winding of the automotive alternator in FIG. 1 during manufacture.
Figure 7:
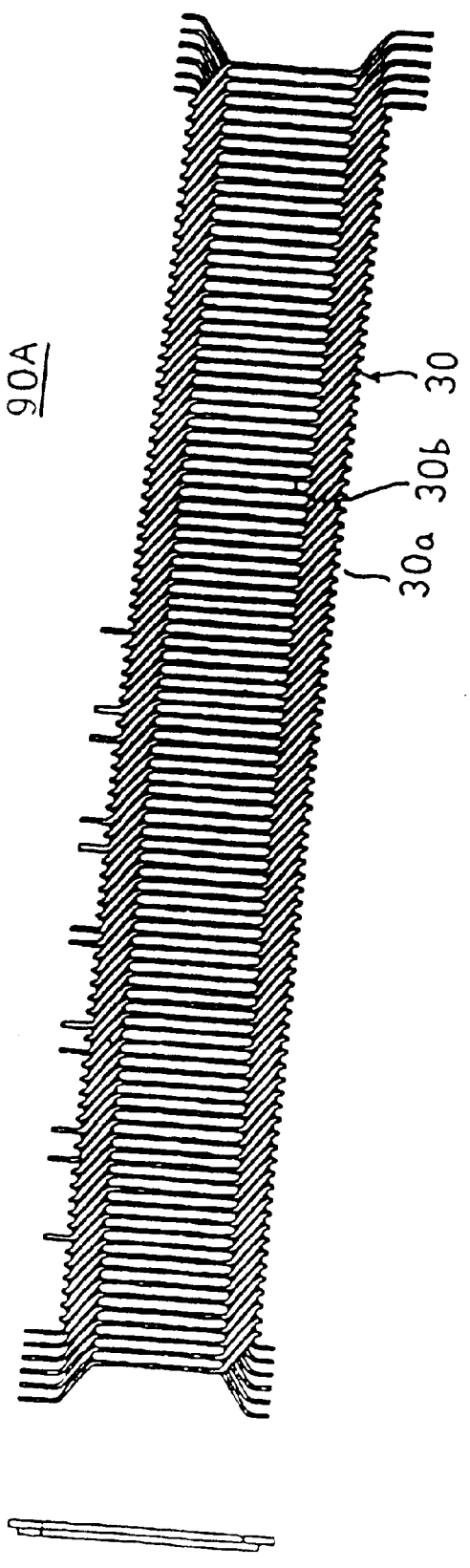
FIGS. 7(a) and 7(b) are an end elevation and a plan, respectively, showing a winding assembly constituting part of a three-phase stator winding of the automotive alternator in FIG. 1.
Figure 8:
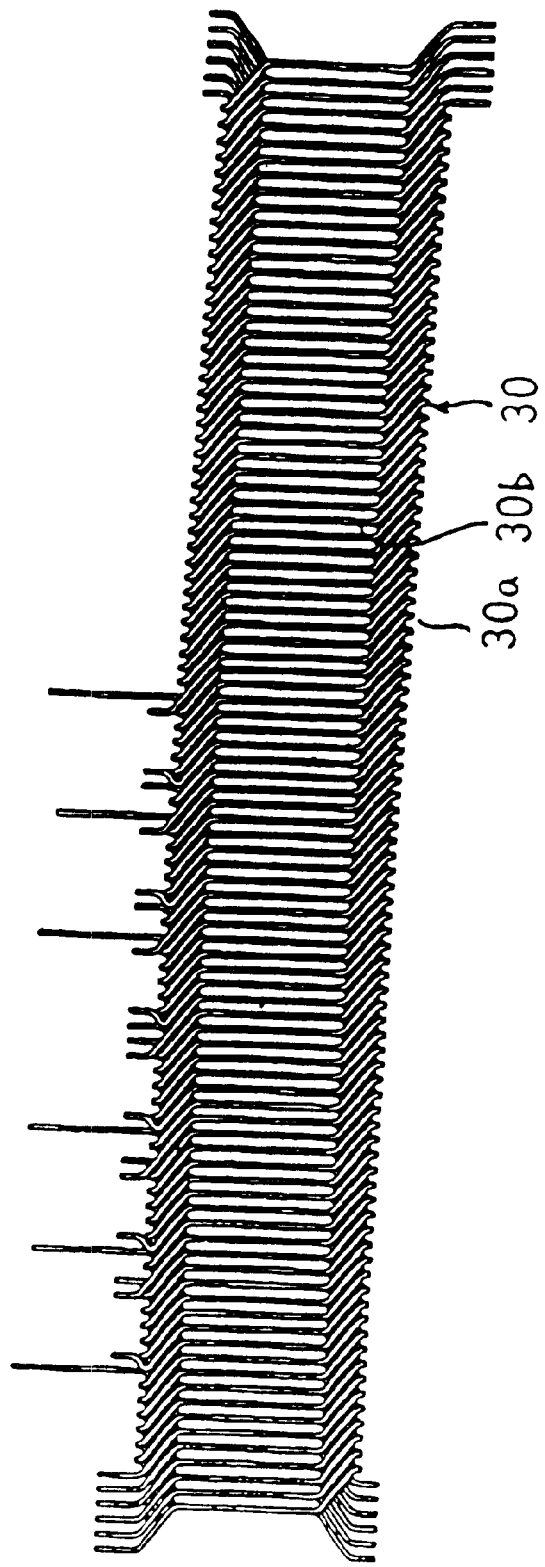
FIGS. 8(a) and 8(b) are an end elevation and a plan, respectively, showing a winding assembly constituting part of a three-phase stator winding of the automotive alternator in FIG. 1.

First, as shown in FIG. 5, twelve conductors 30 are simultaneously bent in the same plane to form a lightning-bolt shape. Then, the winding assembly 90A shown in FIG. 7 is prepared by progressively folding the conductors at right angles, as indicated by the arrow in FIG. 6, using a jig. In addition, the winding assembly 90B which has bridging connections and output wires as shown in FIG. 8 is prepared in the same manner.

Figure 9:
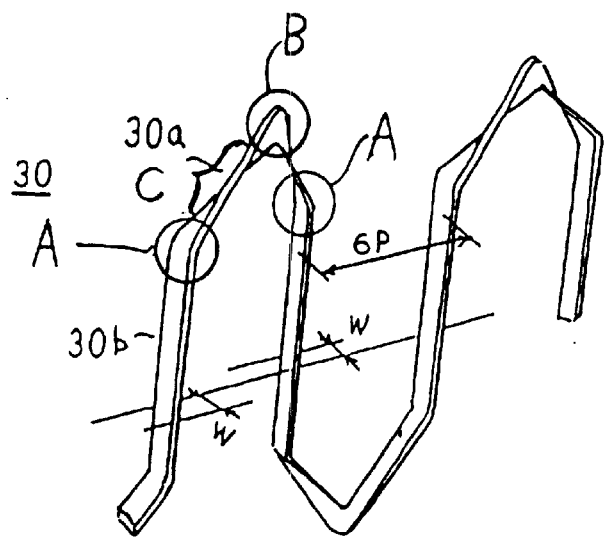
FIG. 9 is a perspective showing part of a conductor constituting part of a three-phase stator winding of the automotive alternator in FIG. 1.
Figure 10:
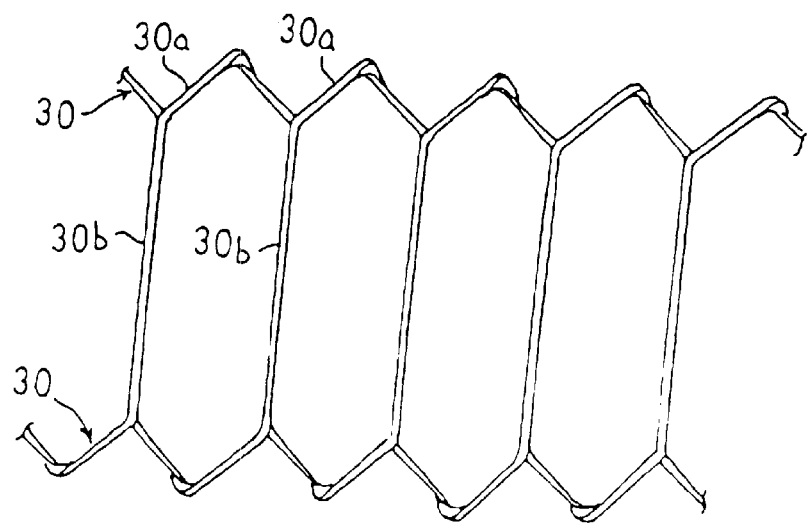
FIG. 10 is a diagram explaining arrangement of the conductors constituting part of a three-phase stator winding of the automotive alternator in FIG. 1.
Figure 11:
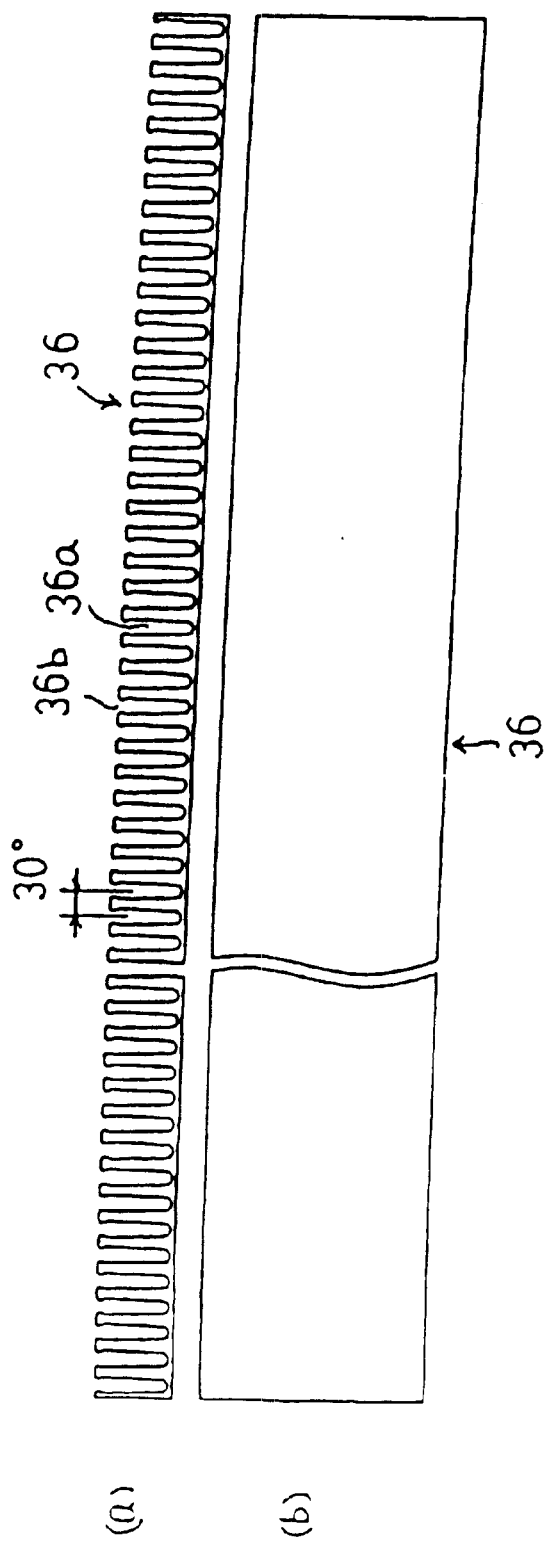
FIGS. 11(a) and 11(b) are a side elevation and a rear plan, respectively, explaining the construction of a stator core of the automotive alternator in FIG. 1.

Moreover, as shown in FIG. 9, each conductor 30 is formed by bending it into a planar pattern in which straight portions 30b connected by extending portions 30a are lined up at a pitch of six slots (6P). Adjacent straight portions 30b are offset by a distance equal to one width (W) of the conductors 30 by means of the extending portions 30a. The winding assemblies 90A and 90B are constructed by arranging six conductor pairs so as to be offset by a pitch of one slot from each other, each conductor pair consisting of two conductors 30 formed in the above pattern which are offset by a pitch of six slots and arranged such that straight portions 30b overlap as shown in FIG. 10. Six end portions of the conductors 30 each extend outwards from first and second sides at first and second ends of the winding assemblies 90A and 90B. Furthermore, the extending portions 30a are arranged so as to line up in rows on first and second side portions of the winding assemblies 90A and 90B.

Because the conductors 30 are formed by bending at base portions A and end portions B of the extended portions 30a, residual strain arises in the base portions A and the end portions B making the hardness greater than in central portions C. Next, the winding assemblies 90A and 90B are annealed for ten minutes at 300° C. so that the belt-shaped winding assemblies 90A and 90B can be easily formed into an annular shape, and at that time, the residual strain in the base portions A and the end portions B is removed, making the hardness therein less than in the central portions C, that is to say, they become softer.

Meanwhile, the parallelepiped laminated body 36 is prepared as shown in FIGS. 11(a) and 11(b) by laminating a predetermined number of sheets of SPCC material formed with trapezoidal slots 36a at a predetermined pitch (an electrical angle of 30°) and laser welding an outer portion thereof.

Figure 13:
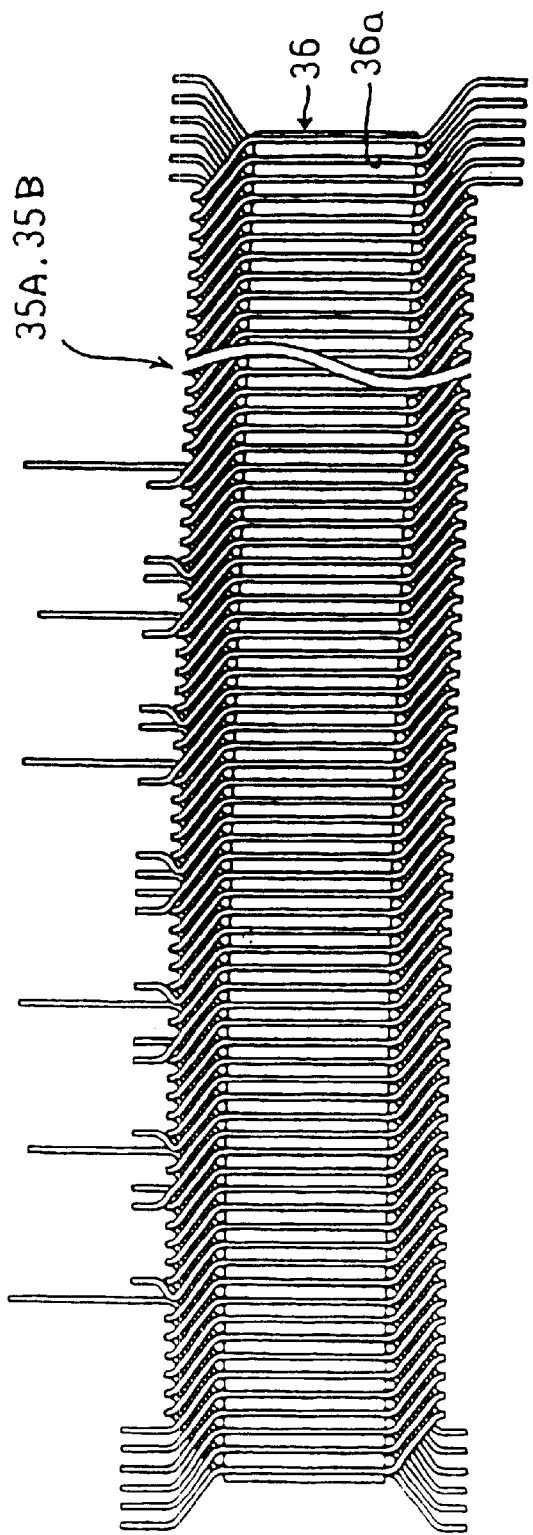
FIG. 13 is a plan showing three-phase stator windings of the automotive alternator in FIG. 1 mounted into a laminated body.
Figure 14:
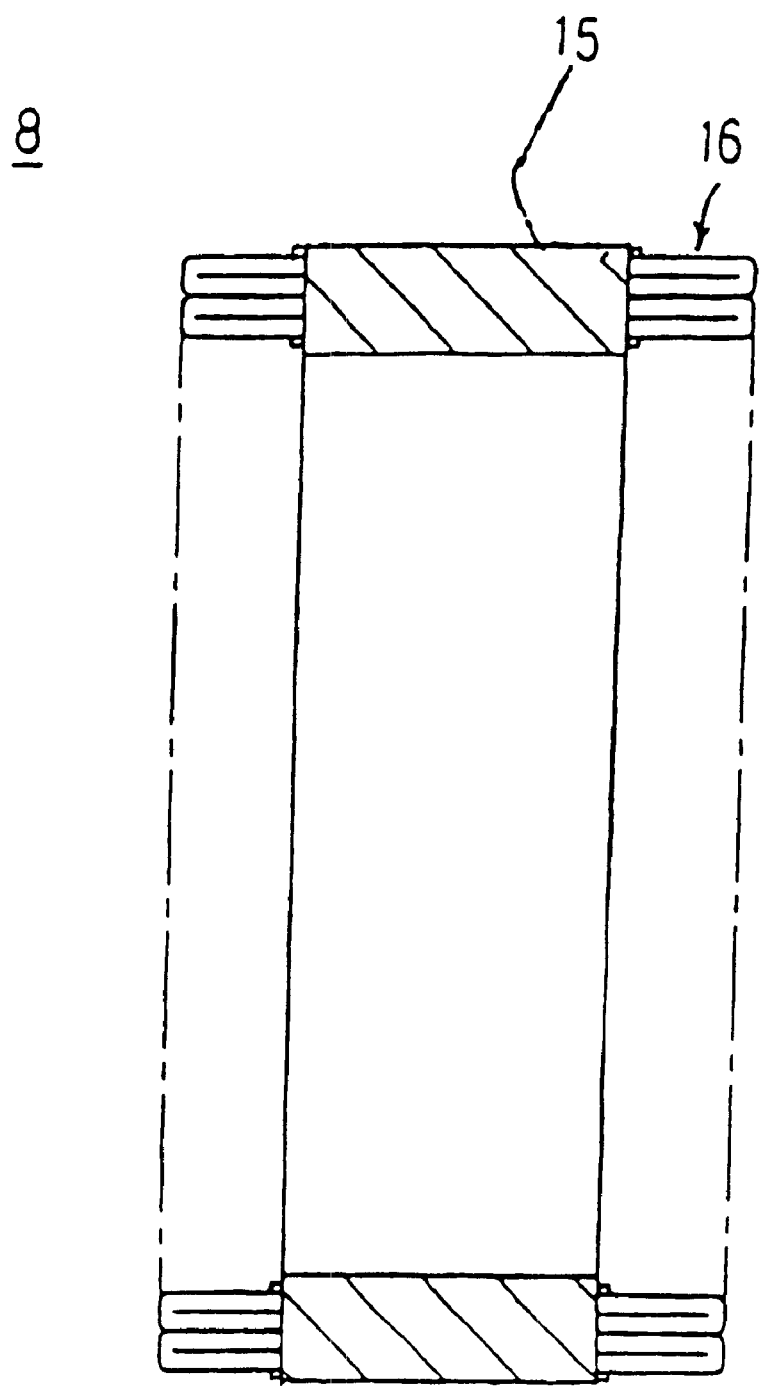
FIG. 14 is a cross section of the stator of the automotive alternator in FIG. 1.

As shown in FIG. 12(a), the insulators 19 are mounted in the slots 36a of the parallelepiped laminated body 36, and the straight portions of the two winding assemblies 90A and 90B are inserted so as to stack up within each of the slots. In this manner, the two winding assemblies 90A and 90B are installed in the parallelepiped laminated body 36 as shown in FIG. 12(b). At this time, straight portions 30b of the conductors 30 are housed in lines of four in a radial direction within the slots 36a and are electrically insulated from the parallelepiped laminated body 36 by the insulators 19. Furthermore, as shown in FIG. 13, the two winding assemblies 90A and 90B are installed in the laminated body 36 so as to stack up one on top of the other.

Next, the laminated body 36 is rolled up and its end surfaces abutted and welded to each other to obtain a stator core 15. At this time, as shown in FIG. 12(c), the slots 36a (corresponding to the slots 15a in the stator core) take on a generally rectangular cross-sectional shape, and opening portions 36b of the slots 36a (corresponding to opening portions 15b of the slots 15a) become smaller than the slot-width dimensions of the straight portions 30b. Then, the end portions of each of the conductors 30 are connected to each other based on the connections shown in FIG. 3 to form the stator winding group 16 and obtain the stator 8 shown in FIG. 14.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the first pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the current is adjusted by the regulator 18, and the battery is recharged.

At the rear end, external air is drawn in through the air intake vents 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end 16b of the polyphase stator winding 16 before being expelled to the outside through the air discharge vents 2b.

At the same time, at the front end, external air is drawn in axially through the air intake vents la by rotation of the fans 5, and is then deflected centrifugally by the fans 5, cooling the front-end coil end 16a of the polyphase stator winding 16 before being expelled to the outside through the air discharge vents 1b.

In the automotive alternator of the above construction, because the front-end coil end 16a and the rear-end coil end 16b are composed of a number of extended portions lined up circumferentially, it is easy to achieve the desired hardness in the extended portions 30a of the coil ends 16a and 16b.

Furthermore, the front-end coil end 16a and the rear-end coil end 16b each have a hardness distribution in which the hardness varies in the axial direction, and the hardness distribution is the same for each. Consequently, in contrast to the stator core 15 which vibrates three-dimensionally, the extended portions 30a at both axial ends of the stator core 15 serve a damping function against vibrations in the stator core 15, enabling vibration amplitude to be suppressed.

In particular, because the hardness distribution of the extended portions 30a is such that the hardness in the central portions C is greater than in the end portions B and the base portions A, the central portions C undergo secondary vibration with the end portions B and the base portions A as vibrational nodes, enabling the vibrational amplitude of the stator core 15 to be suppressed even more effectively.

This embodiment includes two sets of winding assemblies 90A and 90B, and the damping effects of friction between these is also great.

Figure 17:
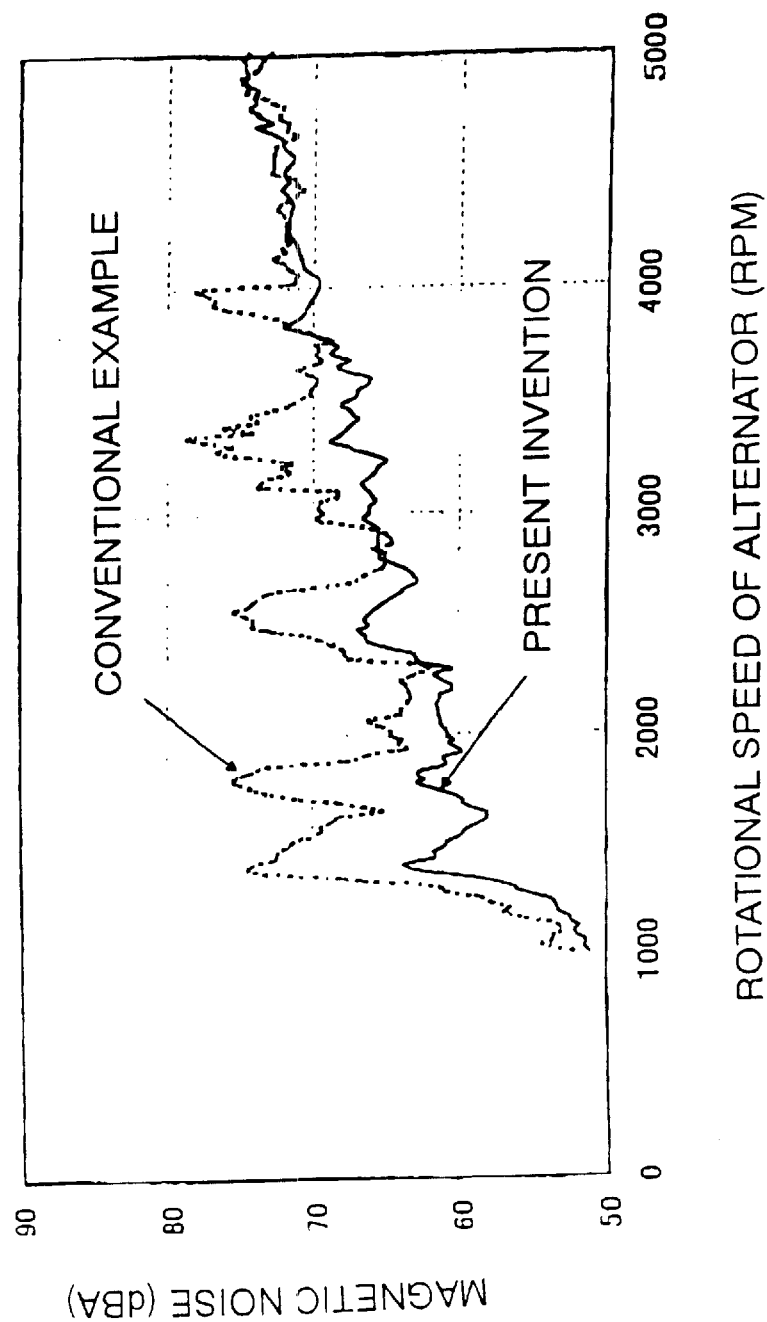
FIG. 17 is a graph of magnetic noise characteristics.
Figure 18:
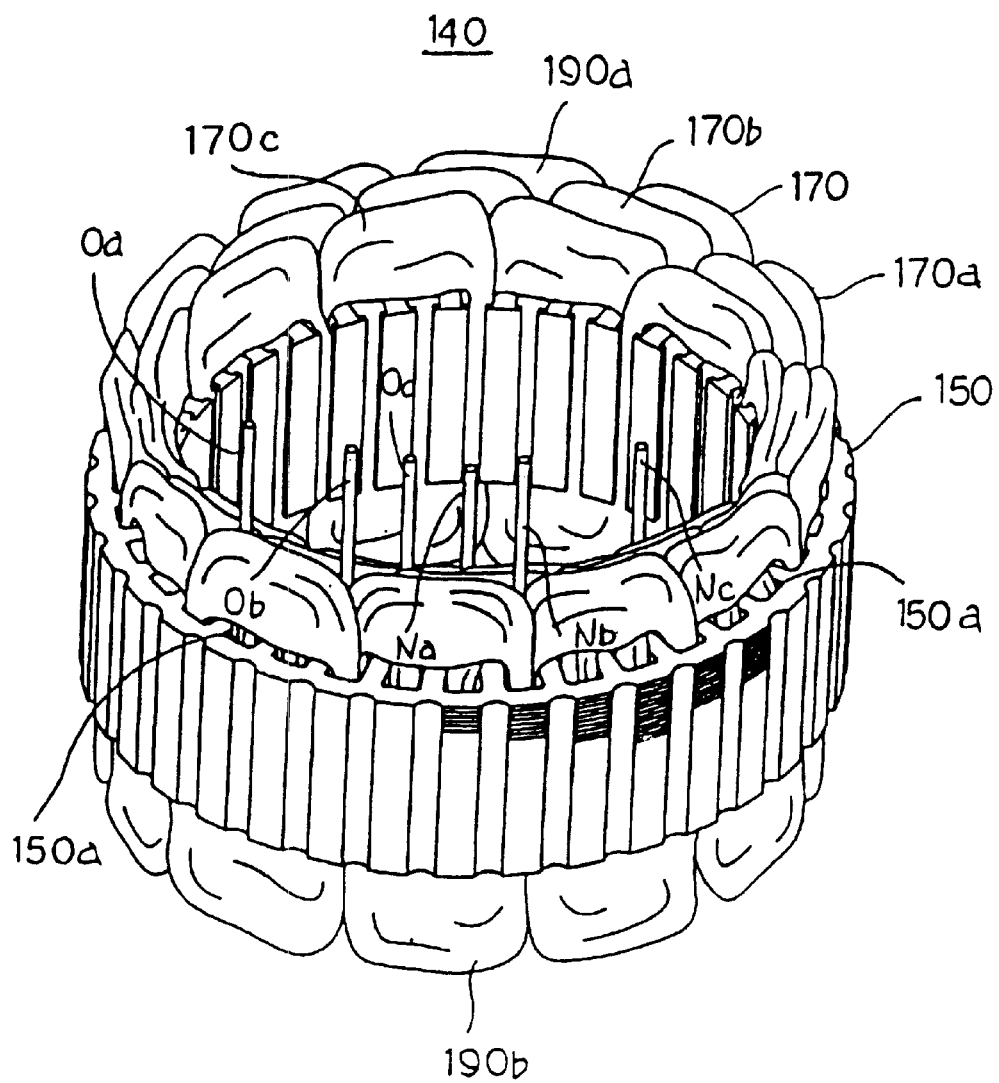
FIG. 18 is a perspective of a stator of a conventional automotive alternator.
Figure 19:
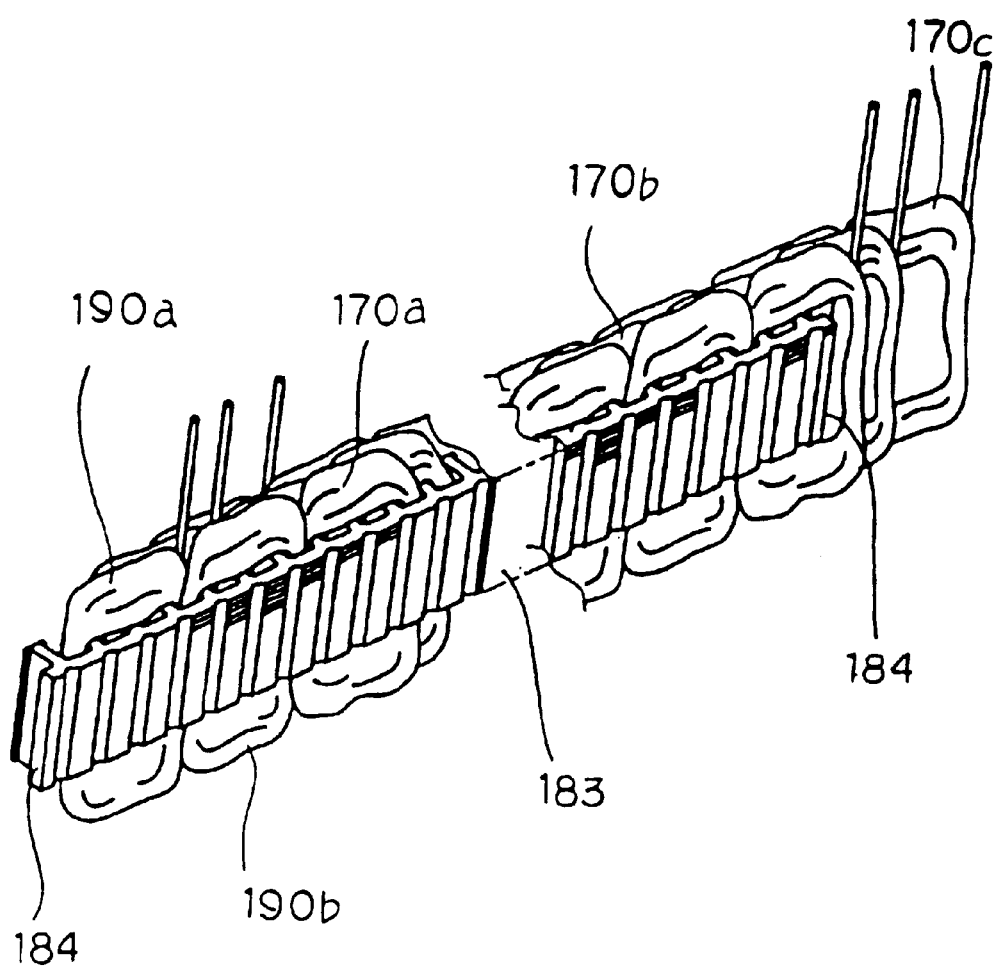
FIG. 19 is a perspective of the stator in FIG. 18 during manufacture.

FIG. 17 is a graph of magnetic noise characteristics obtained in experiments by the present inventors. As is clear from this graph, it has been confirmed that magnetic noise arising in the alternator according to Embodiment 1 is reduced in comparison to that of the conventional example. In particular, the peak noise at certain rotational frequencies due to resonance phenomena in the stator core 15 is significantly dampened.

The process of hardening the extended portions 30a is performed at the same time as the bending of the conductors 30, and the process of heat-softening the extended portions 30a is performed at the same as the annealing of the belt-shaped winding assemblies 90A and 90B, eliminating the need to provide separate steps for hardening and heat-softening processes in order to adjust the hardness of the extended portions 30a.

In this Embodiment 1, the whole of each extended portion 30a is heat-softened after first being bent and hardened, making the reduction in hardness by the heat-softening process particularly great in the base portions A and the end portions B where the hardening process has been applied. Consequently, hardness can easily be reduced at predetermined positions on the extended portions 30a making using of this characteristic.

The extended portions 30a protrude axially from their respective end surfaces of the stator core 15 from between teeth which have low rigidity which form frames between the slots 15a, but because the extended portions 30a are formed with generally the same shape, it is possible to achieve the desired hardness distribution in the extended portions 30a of the coil ends 16a and 16b which is suitable for suppressing vibrations in the stator core 15.

Irregularities are reduced in the end surfaces of the coil ends 16a and 16b, making the space efficiency inside the case superior, and also making the leakage inductance uniform, enabling the achievement of stable output. In addition, heat is generated substantially uniformly around the circumference of the coil ends 16a and 16b, enabling temperature increases in the stator winding 16 to be suppressed.

Because spaces are formed circumferentially between adjacent extended portions 30a, the central portions C can vibrate with the end portions B and the base portions A as vibrational nodes without interfering with adjacent extended portions 30a, enabling the extended portions 30a to reliably suppress vibrations in the stator core 15. Furthermore, cooling ventilation from the fans 5 passes uniformly through the coil ends 16a and 16b, improving cooling, and wind resistance is made uniform in the circumferential direction, reducing wind noise.

Embodiment 2

Figure 15:
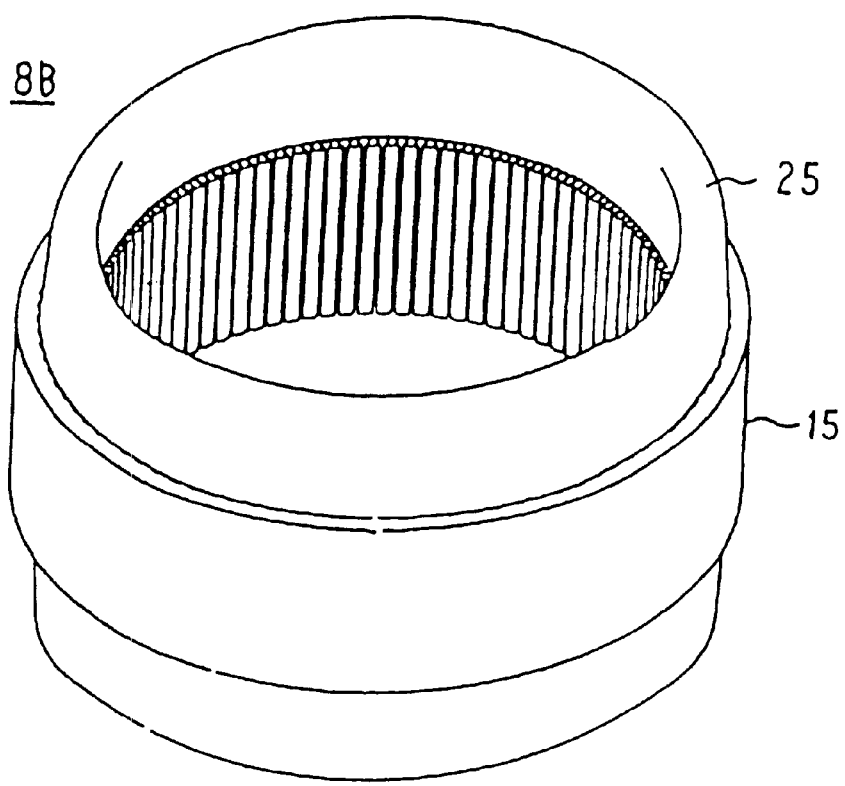
FIG. 15 is a perspective of a stator according to Embodiment 2 of the present invention.

FIG. 15 is a perspective of a stator 8B of an automotive alternator according to Embodiment 2 of the present invention. The stator 8B differs from the stator 8 in Embodiment 1 in that the coil end 16a and 16b are integrally molded in an electrically-insulative resin 25. The electrically-insulative resin 25 is a mixture of epoxy resin (principal component) having a thermal conductivity of 0.5 (W/mk) and alumina having a thermal conductivity of 3.5 (W/mk) in a ratio of one to four (1:4). Moreover, the output wires and neutral-point lead wires of each phase have been omitted from the drawing.

In this embodiment, because the electrically-insulative resin 25, which also has a large vibration damping coefficient, is disposed in the coil ends 16a and 16b, vibrations in the stator core 15 are greatly suppressed, enabling magnetic noise to be reduced. The electrically-insulative resin 25 between the extended portions 30a in particular contributes greatly to the reduction in magnetic noise. The electrically-insulative resin 25 between the extended portions 30a also significantly improves insulation between the extended portions 30a.

The above embodiments were explained for a three-phase winding 16 in which there were four turns of conductors 30, but when high output is required at even lower speeds, the number of turns of conductors may be made six turns or eight turns, for example, or the extended portions of the coil ends may be arranged in three rows or four rows circumferentially. In this kind of construction, frictional damping between the winding assemblies is further improved.

In each of the above embodiments, the number of slots in the stator was ninety-six slots for sixteen magnetic poles, but three phases and seventy-two slots for twelve magnetic poles, 120 slots for twenty poles, etc., may also be adopted. Furthermore, in the case of one slot per pole per phase, there may also be forty-eight slots for sixteen poles, thirty-six slots for twelve poles, sixty slots for twenty poles, etc. If the number of slots is increased in this manner, the rigidity of the stator core 15 decreases, but since the number of extended portions also increases, the present invention is well suited.

Hardening of the extended portions can also be achieved by adopting only one process of either the bending hardening process or the heat-softening process.

As explained above, an alternator according to one aspect of the present invention comprises a first coil end and a second coil end comprising a number of extended portions constituted by conductors being lined up circumferentially. Therefore, control of the hardness in the extended portions of the first coil end and the second coil end is facilitated, enabling the achievement of the desired hardness distribution.

Further, the first coil end and said second coil end have a hardness distribution in which hardness varies in an axial direction, the hardness distribution is the same in the first coil end and the second coil end. Therefore, the high-density extended portions at both axial ends of the stator core serve a damping function against vibrations in the stator core, enabling vibrational amplitude to be suppressed and also enabling magnetic noise to be significantly reduced.

According to one form of the alternator, the hardness distribution in the extended portions may be such that hardness is greater in a central portion than in an end portion and a base portion of the extended portions. Therefore, the central portions undergo secondary vibration with the end portions and the base portions as vibrational nodes, thereby enabling the vibrational amplitude of the stator core to be further suppressed, and also enabling magnetic noise to be significantly reduced.

According to another form of the alternator, modification of hardness of the extended portions may be applied by at least one process selected from a bending and hardening process and a heat-softening process. Therefore, desired hardness in the extended portions can be achieved simply.

According to still another form of the alternator, a heat-softening process may be applied to the whole of the extended portions after first applying a bending and hardening process. Therefore, the process of hardening the extended portions is performed at the same time as the bending of the conductors, and the process of heat-softening the extended portions is performed at the same as the annealing of the conductors as a whole, eliminating the need to provide separate steps for hardening and heat-softening processes in order to adjust the hardness of the extended portions.

According to still another form of the alternator, 2n layers of the conductors may be disposed in the slot depth direction in each of the slots; and the extended portions may be arranged so as to align into n rows in a circumferential direction. Therefore, vibrations in the stator core are further suppressed by the high-density extended portions which are arranged in n rows, enabling magnetic noise to be further reduced. Furthermore, axial dimensions of the coil ends can be reduced, enabling space efficiency to be increased. If the extended portions are lined up in two or more rows circumferentially, damping force is increased by friction arising between the extended portions, enabling magnetic noise to be reduced even further.

According to still another form of the alternator, the extended portions may be formed into the same general shape. Therefore, the hardness distribution in each of the extended portions of the coil ends becomes uniform, facilitating control of the hardness in the extended portions of the first coil end and the second coil end and enabling the desired hardness distribution to be easily achieved in appropriate positions for suppressing vibrations in the stator core. Furthermore, irregularities are reduced in the end surfaces of the coil ends, making the space efficiency superior, and also making the leakage inductance uniform, enabling the achievement of stable output. In addition, heat is generated substantially uniformly around the circumference of the coil ends, enabling temperature increases in the polyphase stator winding to be suppressed.

According to still another form of the alternator, spaces may be formed between adjacent extended portions in a circumferential direction. Therefore, the extended portions can vibrate without interfering with adjacent extended portions, enabling the extended portions to contribute reliably to the suppression of vibrations in the stator core. Furthermore, cooling ventilation from the fans passes uniformly through the coil ends, improving cooling, and wind resistance is made uniform in the circumferential direction, reducing wind noise.

According to still another form of the alternator, resin may be disposed around the extended portions. Therefore, vibrations in the stator core may be greatly suppressed by the electrically-insulative resin, which has a large vibration damping coefficient, and the electrically-insulative resin between the extended portions in particular contributes greatly to the reduction in magnetic noise. Insulation between the extended portions is also significantly improved.

What is claimed is:

1. An alternator comprising:
   a rotor for forming north-seeking (N) and south-seeking (S) poles alternately about a rotational circumference; and
   a stator comprising:
      a stator core surrounding said rotor; and
      a polyphase stator winding installed in said stator core,
      said stator core being formed with a number of slots extending axially at a predetermined pitch in a circumferential direction,
      said polyphase stator winding being provided with stator winding sub-portions in each of which a conductor is wound so as to alternately occupy an inner layer and an outer layer in a slot depth direction within said slots at intervals of a predetermined number of slots, said conductor folding back outside said slots at axial end surfaces of said stator core to form a first coil end and a second coil end, said first coil end and said second coil end comprising a number of extended portions constituted by said conductors being lined up circumferentially, and said first coil end and said second coil end having a hardness distribution in which hardness varies in an axial direction, said hardness distribution being substantially identical from respective end portions to respective base portions of said number of extended portions, and said hardness distribution of the first coil end and the second coil end is substantially identical.

2. The alternator according to claim 1 said hardness distribution in said extended portions is such that hardness is greater at a central portion than at said end portion and said base portion of said extended portions.

3. The alternator according to claim 1 wherein modification of hardness of said extended portions is applied by at least one process selected from a bending and hardening process and a heat-softening process.

4. The alternator according to claim 3 wherein a heat-softening process is applied to the whole of said extended portions after first applying a bending and hardening process.

5. The alternator according to claim 1 wherein:

said extended portions are arranged so as to align into n rows in a radial direction, comprising 2n layers of said conductors disposed in said slot depth direction in each of said slots.

6. The alternator according to claim 1 wherein said extended portions are formed into the same general shape.

7. The alternator according to claim 1 wherein spaces are formed between adjacent extended portions in a circumferential direction.

8. The alternator according to claim 1 wherein resin is disposed around said extended portions.

9. The alternator according to claim 5, wherein said extended portions are arranged into two rows aligned in a radial direction including four layers of said conductors disposed in a radial direction within each of said slots.

10. A stator of an automotive alternator, comprising:

a stator core surrounding said rotor; and a stator winding installed in said stator core, said stator core being formed with a number of slots extending axially in a radial direction, said stator winding having stator winding sub-portions, each including a conductor wound so as to alternately occupy an inner layer of the stator winding sub-portion and an outer layer of the stator winding sub-portion within said slots at intervals of a predetermined number of slots, wherein at least two such sub-portions are disposed in a slot depth direction within said slots, and each said conductor forms a first coil end and a second coil end outside said slots at axial end surfaces of said stator core;

said conductors in said first coil end and said second coil end having a hardness distribution in which hardness varies in an axial direction, said hardness distribution being substantially identical from respective end portions to respective base portions of said number of extended portions, and said hardness distribution of the first coil end and the second coil end is substantially identical.

* * * * *